(12) United States Patent
Krumanaker et al.

(10) Patent No.: US 11,519,284 B2
(45) Date of Patent: Dec. 6, 2022

(54) TURBINE ENGINE WITH A FLOATING INTERSTAGE SEAL

(71) Applicant: General Electric Company, Schenectady, NY (US)

(72) Inventors: Matthew Lee Krumanaker, Blue Ash, OH (US); Thomas Joseph Lipinski, Monroe, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/890,473

(22) Filed: Jun. 2, 2020

(65) Prior Publication Data

US 2021/0372290 A1 Dec. 2, 2021

(51) Int. Cl.
*F01D 11/02* (2006.01)
*F02C 7/28* (2006.01)

(52) U.S. Cl.
CPC .............. *F01D 11/025* (2013.01); *F02C 7/28* (2013.01); *F05D 2220/32* (2013.01); *F05D 2240/55* (2013.01)

(58) Field of Classification Search
CPC ...... F01D 11/001; F01D 11/02; F01D 11/025; F01D 11/005; F16J 15/447
See application file for complete search history.

(56) References Cited

U.S. PATENT DOCUMENTS

| | | | |
|---|---|---|---|
| 3,018,085 A * | 1/1962 | Welsh | F01D 11/025 |
| | | | 415/136 |
| 4,662,821 A | 5/1987 | Kervistin et al. | |
| 6,471,213 B1 | 10/2002 | Yur et al. | |
| 7,635,251 B2 * | 12/2009 | Duesler | F01D 11/001 |
| | | | 415/173.7 |
| 7,971,882 B1 | 7/2011 | Liang | |
| 8,133,014 B1 | 3/2012 | Ebert et al. | |
| 8,708,641 B2 | 4/2014 | Ueda et al. | |
| 2016/0102608 A1 | 4/2016 | Lynn | |
| 2017/0107839 A1 | 4/2017 | Glahn et al. | |
| 2017/0114659 A1 | 4/2017 | Imbourg et al. | |
| 2018/0347386 A1 | 12/2018 | Sellhorn et al. | |
| 2021/0054745 A1 * | 2/2021 | Vetters | F01D 5/284 |

* cited by examiner

*Primary Examiner* — Woody A Lee, Jr.
*Assistant Examiner* — Cameron A Corday
(74) *Attorney, Agent, or Firm* — McGarry Bair PC (57) ABSTRACT

A turbine engine having an engine core, a first seal structure, a plurality of circumferentially arranged vanes, a plurality of struts, and a second seal structure. The engine core can define a rotor and a stator having a casing. The first seal structure can include a finger seal projecting from the rotor. The plurality of circumferentially arranged vanes can include an uppers band mounted to the casing, and a lower band located radially above the finger seal. At least some of the struts of the plurality of struts can extend through the plurality of circumferentially arranged vanes. The second seal structure can form a seat with the lower band.

20 Claims, 5 Drawing Sheets

TURBINE ENGINE WITH A FLOATING INTERSTAGE SEAL

STATEMENT REGARDING FEDERALLY SPONSORED RESEARCH AND DEVELOPMENT

This invention was made with United States Government support. The Government has certain rights in this invention.

TECHNICAL FIELD

The disclosure generally relates to an interstage seal for an engine, and more specifically to a dynamic interstage seal that is movably connected to an airfoil.

BACKGROUND

Turbine engines, and particularly gas turbine engines, are rotary engines that extract energy from a flow of air passing through the engine onto a multitude of rotating blades and stationary vanes, through a combustor, and then through a series of turbine stages. The compressor and turbine stages comprise axially arranged pairs of rotating blades and stationary vanes. The rotating blades are supported by disks while the vanes are supported by a casing circumscribing the disks. Interstage seals can be placed between an inner band of the vane and the corresponding disk.

A labyrinth seal can include fingers extending radially outward from the disks. The fingers terminate in tips below the inner band of the vane, which typically has a wear element, such as a honeycomb pad statically mounted to the inner band and confronting the finger tips. During operation of the turbine engine, the finger tips can come into contact with a wear element attached to a stationary airfoil such that airflow is restricted at the contact region from one side of the static airfoil to the other. The static mounting wear element increases the likelihood of temporary contact between the finger tips and the wear element, leading to a faster wearing of the wear element.

BRIEF DESCRIPTION

In one aspect, the disclosure relates to a turbine engine comprising an engine core comprising at least a compressor section, combustor section, and turbine section in axial flow arrangement and defining a rotor and a stator having a casing circumferentially surrounding at least a portion of the rotor, a first seal structure comprising a finger seal projecting from the rotor and circumferentially extending about the rotor, a plurality of circumferentially arranged vanes forming an upper band mounted to the casing and a lower band located radially above the finger seal, a plurality of struts having a radial outer end secured to the casing and a radial inner end extending radially inwardly beyond the lower band, and at least some of the struts extending through the vanes, and a second seal structure extending circumferentially about the first seal structure and comprising a floating seal movably mounted to at least some of the struts and forming a seal with the lower band, and a wear element circumferentially surrounding and confronting the finger seal.

In another aspect, the disclosure relates to a turbine engine comprising an engine core comprising a rotor and a stator having a casing circumferentially surrounding at least a portion of the rotor, a plurality of circumferentially arranged vanes forming an upper band mounted to the casing and a lower band extending circumferentially about and spaced from the rotor, and a floating seal carried by at least one of the stator or vanes and radially movable relative to the lower band and sealing the lower band relative to the rotor.

DETAILED DESCRIPTION

Aspects of the disclosure described herein are broadly directed to a sealing system having a seal with a rotating section and a static floating section connected to an airfoil via a strut. For the purposes of illustration, one exemplary environment within which the sealing system can be utilized will be described in the form of a turbine engine. Such a turbine engine can be in the form of a turbine engine, a turboprop, turboshaft or a turbofan engine having a power gearbox, in non-limiting examples. It will be understood, however, that aspects of the disclosure described herein are not so limited and can have general applicability within other sealing systems. For example, the disclosure can have applicability for a sealing system in other engines or vehicles, and can be used to provide benefits in industrial, commercial, and residential applications.

As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, when used in terms of fluid flow, fore/forward can mean upstream and aft/rearward can mean downstream.

Additionally, as used herein, the terms "radial" or "radially" refer to a direction away from a common center. For example, in the overall context of a turbine engine, radial refers to a direction along a ray extending between a center longitudinal axis of the engine and an outer engine circumference. Furthermore, as used herein, the term "set" or a "set" of elements can be any number of elements, including only one.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, secured, fastened, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

Figure 1:
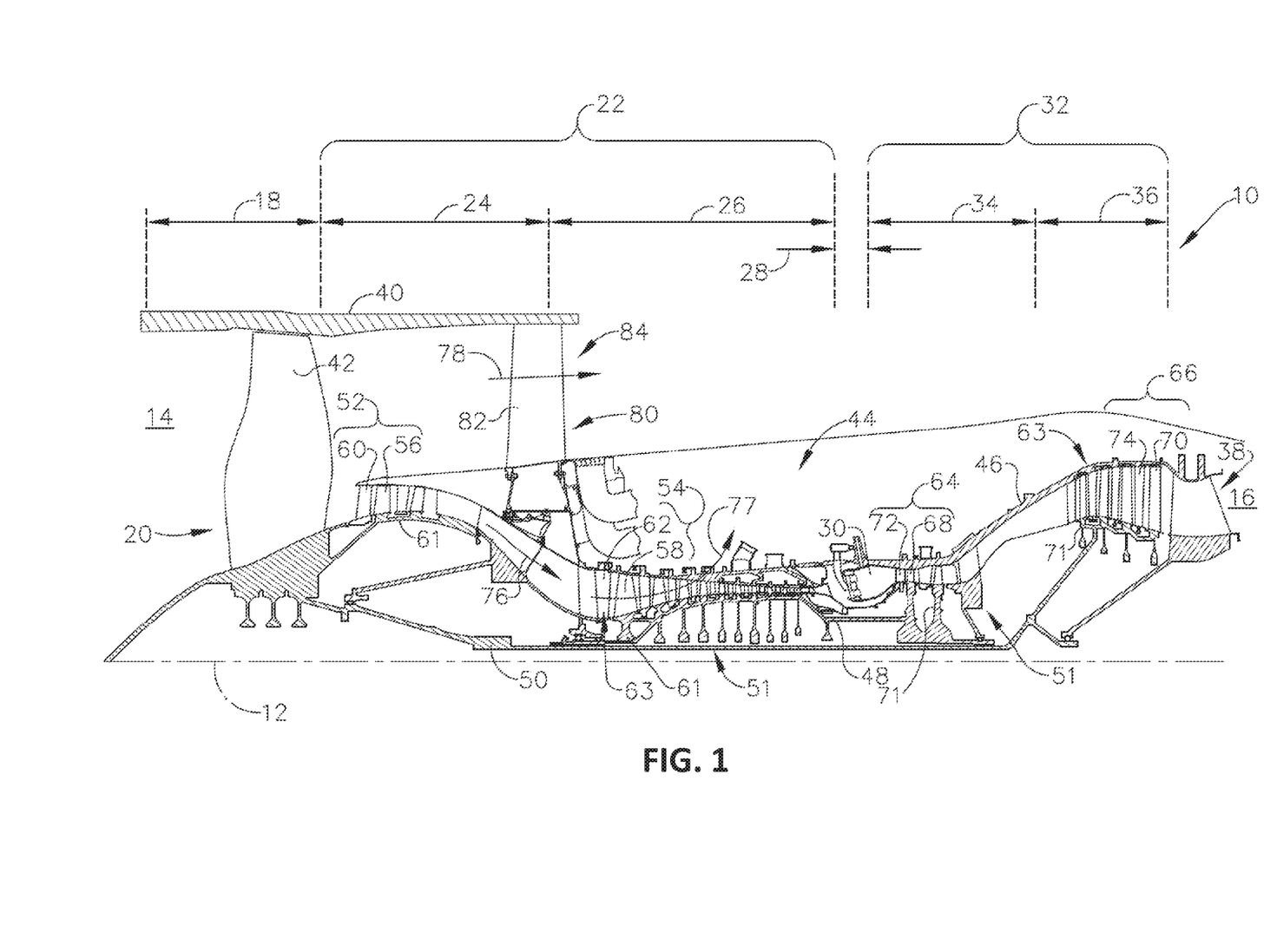
FIG. 1 is a schematic cross-sectional diagram of a turbine engine for an aircraft.

FIG. 1 is a schematic cross-sectional diagram of a turbine engine 10 for an aircraft. The turbine engine 10 has a generally longitudinally extending axis or engine centerline 12 extending forward 14 to aft 16. The turbine engine 10 includes, in downstream serial flow relationship, a fan section 18 including a fan 20, a compressor section 22 including a booster or low pressure (LP) compressor 24 and a high pressure (HP) compressor 26, a combustor section 28 including a combustor 30, a turbine section 32 including a HP turbine 34, and a LP turbine 36, and an exhaust section 38.

The fan section 18 includes a fan casing 40 surrounding the fan 20. The fan 20 includes a plurality of fan blades 42 disposed radially about the engine centerline 12. The HP compressor 26, the combustor 30, and the HP turbine 34 form an engine core 44 of the turbine engine 10, which generates combustion gases. The engine core 44 is surrounded by engine core casing 46, which can be coupled with the fan casing 40.

A HP shaft or spool 48 disposed coaxially about the engine centerline 12 of the turbine engine 10 drivingly connects the HP turbine 34 to the HP compressor 26. A LP shaft or spool 50, which is disposed coaxially about the engine centerline 12 of the turbine engine 10 within the larger diameter annular HP spool 48, drivingly connects the LP turbine 36 to the LP compressor 24 and fan 20. The spools 48, 50 are rotatable about the engine centerline 12 and couple to a plurality of rotatable elements, which can collectively define a rotor 51.

The LP compressor 24 and the HP compressor 26 respectively include a plurality of compressor stages 52, 54, in which a set of compressor blades 56, 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the engine centerline 12, from a blade platform to a blade tip, while the corresponding static compressor vanes 60, 62 are positioned upstream of and adjacent to the rotating blades 56, 58. It is noted that the number of blades, vanes, and compressor stages shown in FIG. 1 were selected for illustrative purposes only, and that other numbers are possible.

The blades 56, 58 for a stage of the compressor can be mounted to a disk 61, which is mounted to the corresponding one of the HP and LP spools 48, 50, with each stage having a disk 61. The vanes 60, 62 for a stage of the compressor can be mounted to the engine core casing 46 in a circumferential arrangement.

The HP turbine 34 and the LP turbine 36 respectively include a plurality of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the engine centerline 12, from a blade platform to a blade tip, while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

The blades 68, 70 for a stage of the turbine can be mounted to a disk 71, which is mounted to the corresponding one of the HP and LP spools 48, 50, with each stage having a dedicated disk 71. The vanes 72, 74 for a stage of the compressor can be mounted to the engine core casing 46 in a circumferential arrangement.

Complementary to the rotor portion, the stationary portions of the turbine engine 10, such as the static vanes 60, 62, 72, 74 among the compressor and turbine sections 22, 32 are also referred to individually or collectively as a stator 63. As such, the stator 63 can refer to the combination of non-rotating elements throughout the turbine engine 10.

In operation, the airflow exiting the fan section 18 is split such that a portion of the airflow is channeled into the LP compressor 24, which then supplies pressurized airflow 76 to the HP compressor 26, which further pressurizes the air. The pressurized airflow 76 from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the turbine engine 10 via the exhaust section 38. The driving of the LP turbine 36 drives the LP spool 50 to rotate the fan 20 and the LP compressor 24.

A portion of the pressurized airflow 76 can be drawn from the compressor section 22 as bleed air 77. The bleed air 77 can be drawn from the pressurized airflow 76 and provided to engine components requiring cooling. The temperature of pressurized airflow 76 entering the combustor 30 is significantly increased. As such, cooling provided by the bleed air 77 is necessary for operating of such engine components in the heightened temperature environments.

A remaining portion of the airflow 78 bypasses the LP compressor 24 and engine core 44 and exits the turbine engine 10 through a stationary vane row, and more particularly an outlet guide vane assembly 80, comprising a plurality of airfoil guide vanes 82, at the fan exhaust side 84. More specifically, a circumferential row of radially extending airfoil guide vanes 82 are utilized adjacent the fan section 18 to exert some directional control of the airflow 78.

Figure 2:
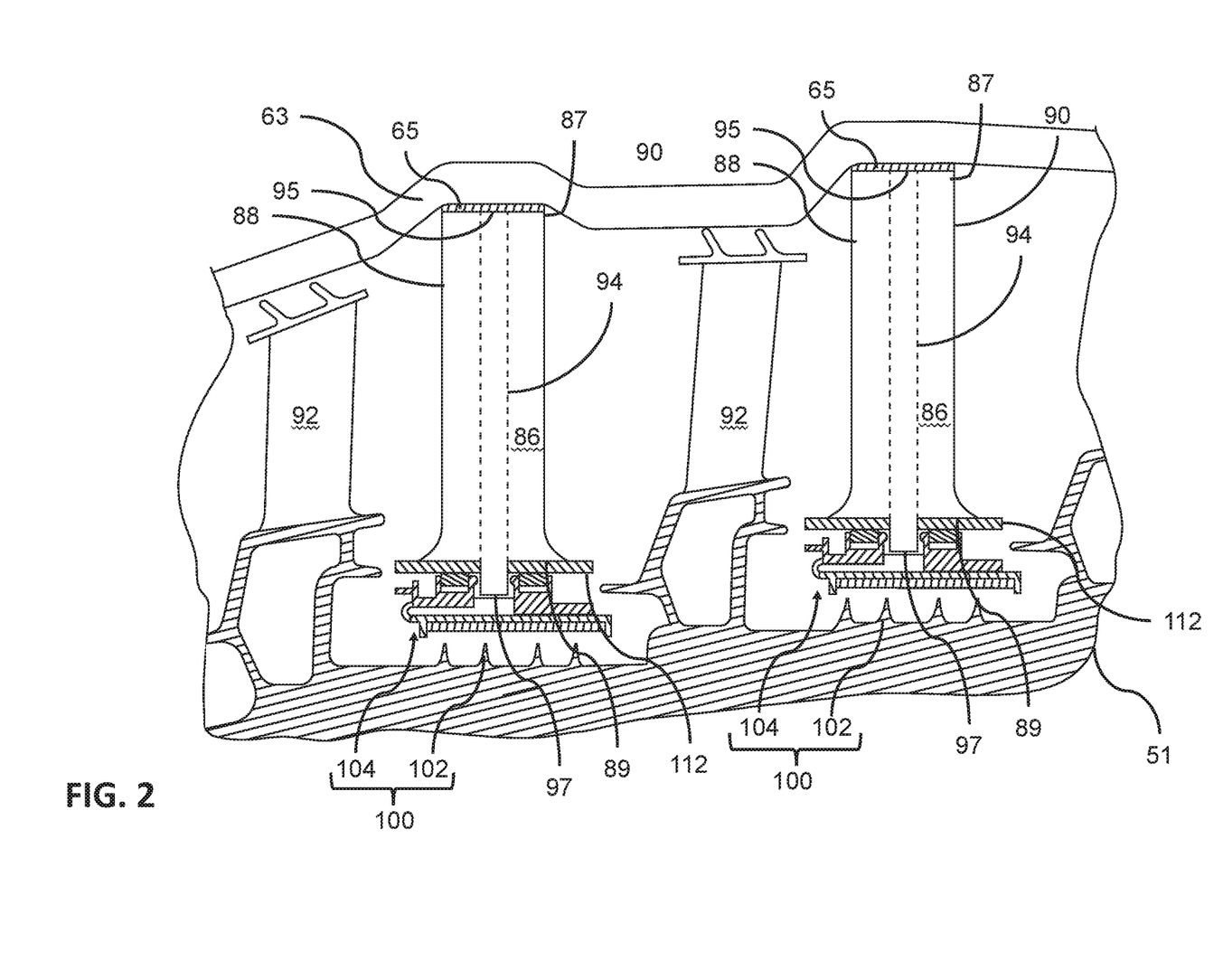
FIG. 2 is a schematic cross-sectional diagram of a section of a turbine engine with an exemplary interstage seal.

FIG. 2 further illustrates the rotor 51, the stator 63, a plurality of airfoils that can be included in the turbine engine 10. In the example shown, the plurality of airfoils can include two blades 92, and two vanes 86. There can be any number of blades 92, or vanes 86 axially distributed along the engine centerline 12. It will be understood that the blades 92, or vanes 86 can be positioned in any section of the turbine engine 10 including the fan section 18, the compressor section 22, or the turbine section 32. The blades 92 can be any one or more of the compressor blades 56, 58, or the turbine blades 68, 70. The vanes 86 can be any one or more of the compressor vanes 60, 62, or the turbine vanes 72, 74.

The blades 92 can be coupled to the rotor 51 and be configured to rotate about the engine centerline 12. The vanes 86 can be coupled to the stator 63. There can be any number of blades 92, or vanes 86 circumferentially arranged around the engine centerline 12.

A stage can be made up of a set of adjacent vanes 86 and blades 92 in either the compressor section 22, or the turbine section 32. There can be multiple stages per compressor section 22, or turbine section 32 of the turbine engine 10.

The vane 86 can include a leading edge 88, a trailing edge 90, a tip 87, and a root 89. The tip 87 of the vane 86 can be coupled to an upper band 65. The upper band 65 can be included as a part of a shroud (not shown). The root 89 of the vane 86 can be coupled to an inner or lower band 112. The upper band 65, and the lower band 112 can extend circumferentially about the rotor 51. Alternatively, portions of the upper band 65 or the lower band 112 can be broken such that the upper band 65 or the lower band 112 can be discrete pieces at the respective ends of each vane. The upper band 65 can be mounted to at least a portion of the engine core casing 46, while the lower band 112 can terminate in an area radially outward from a seal assembly 100.

A vane assembly, that can include circumferentially arranged vanes 86, the lower band 112, and the upper band 65, can be formed as a monolithic piece. Alternatively, the vane assembly can be an assembly of multiple discrete parts. For example, the circumferentially arranged vanes can be coupled to the lower band 112, or the upper band 65 where each of the pieces can be a separate, discretely manufacture piece. Alternatively, one or more components of the vane assembly can be a monolithic piece, that can be attached to other parts of the assembly. It will be appreciated that many variations exist.

The seal assembly 100 can be located radially between the vane 86 and the rotor 51. The seal assembly 100 retards flow between adjacent stages of the turbine engine 10. The seal assembly can include a first seal structure 102 and a second seal structure 104.

Figure 3:
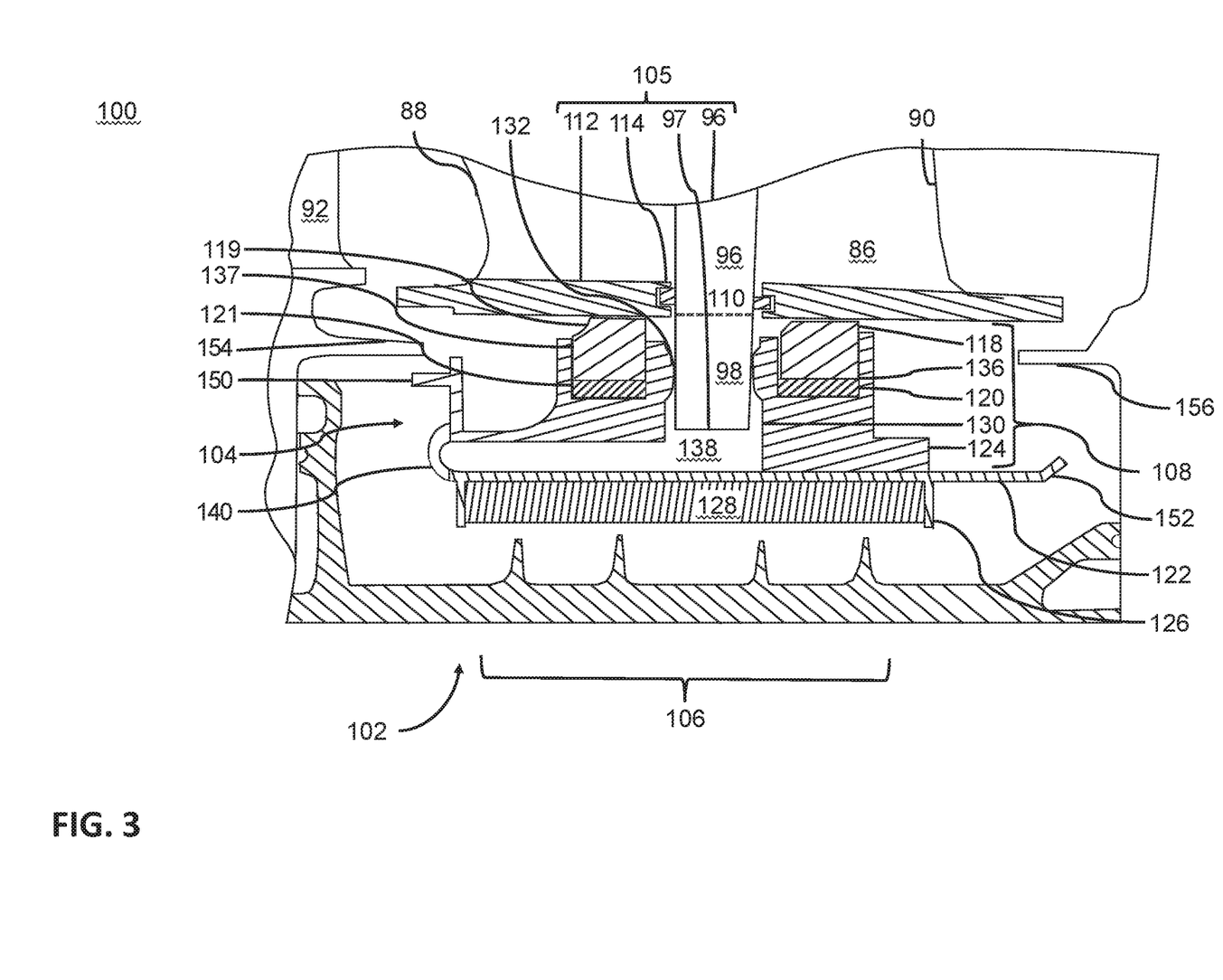
FIG. 3 is an enlarged schematic cross-section diagram of the exemplary seal assembly of FIG. 2.

Referring to FIG. 3, the first and second seal structures 102, 104 and a dynamic mount 105 are described in detail. The first seal structure 102 can be defined as a rotating seal structure, while the second seal structure 104 can be defined as a non-rotating structure.

The dynamic mount 105 couples at least one of the first and second seal structures 102, 104 to the corresponding vane 86 or rotor 51. As illustrated, the second seal structure 104 is dynamically mounted to the vane 86 by dynamic mount 105. The dynamic mounting of one or more of the first and second seal structures 102, 104 enables that seal structure to float relative to the corresponding vane 86 or rotor 51 as the case may be. The floating of the first or second seal structures 102, 104 enables the seal structure to adjust position as need be to maintain a proper seal between the first and second seal structures 102, 104 in response to any physical variation in the first and second seal structures 102, 104 and any operational variation such as caused by differential thermal expansion. The floating of the first or second seal structures 102, 104 can allow for radial, circumferential, or axial movement.

The first seal structure 102 can extend circumferentially around at least a portion of the rotor 51. The first seal structure 102 can include a plurality of finger seals 106 extending radially outwardly and toward the second seal structure 104. The finger seals 106, while illustrated as four fingers, can be any number of fingers. The finger seals can be mounted to or integrally formed with the rotor 51. Although shown as finger seals 106, it will be appreciated that the first seal structure 102 can alternatively include plate seals, carbon seals, or the like.

It is contemplated that the second seal structure 104 can be positioned such that it abuts against the lower band 112 of the vane 86. It is further contemplated that the second seal structure 104 can include a first circumferential ring 122, which can have a wear element 128 confronting the finger seals 106, and a floating seal 108 dynamically sealing against the lower band 112 of the vane 86.

Regarding the first circumferential ring 122, a first angel wing 150 can be located on a leading edge of the first circumferential ring 122 and can form part of a labyrinth seal with a first adjacent angel wing 154 on the upstream blade 92. Similarly, another second angel wing 152 can be located on a trailing edge of the first circumferential ring 122 and form part of a labyrinth seal with a second adjacent angel wing 156 on the downstream blade.

The wear element 128 can be provided alongside a seat 126 located on a radial inner surface of the first circumferential ring 122. The wear element 128 can be positioned such that the entirety of the wear element 128 fits within the seat 126. The wear element 128 can overlay the finger seals 106. The wear element 128 can be a honeycomb structure. Alternatively, the wear element 128 can be a solid piece of a wearable material.

The floating seal 108 can include a second circumferential ring 124, which can be secured to the first circumferential ring 122. The second circumferential ring 124 can be secured to the first circumferential ring 122 via various methods such as, but not limited to, welding, adhesives, fasteners, or the like. Alternatively, the first and second circumferential rings 122, 124 can be a single component including individual components of both the first and second circumferential rings 122, 124.

A set of apertures 130 that can circumferentially spaced about the second circumferential ring 124. A rib 132 can be formed on adjacent the aperture and extend into at least a portion of the aperture 130. A seal guide can be provided within the circumferential ring 124 can define, at least, a first seal guide channel 136 and a second seal guide channel 137. The first seal guide channel 136 can be located upstream of the aperture 130, while the second seal guide channel 137 can be located downstream of the aperture 130. The seal guide can include a set of seal elements 118, 119 and a set of biasing elements 120, 121. The set of seal elements 118, 119, and the biasing elements 120, 121 can be provided within or otherwise coupled to at least a portion of the seal guide. Specifically, the set of seal elements 118, 119 can be coupled to the first and second seal guide channels 136, 137, respectively, while the set of biasing elements 120, 121 can be provided within the first and second seal guide channels 136, 137, respectively. The set of biasing elements 120, 121 can further be coupled to or otherwise abut against the lower band 112. As such, the set of biasing elements 120, 121 can be configured to bias the respective set of seal elements 118, 119 against the lower band 112.

Any one or more of the first and second channels 136, 137, the seal elements 118, 119, or and the biasing elements 120, 121 can be circumferentially continuous or segmented. Additionally, or alternatively, the any one of the first and second channels 136, 137, the seal elements 118, 119, and the biasing elements 120, 121 can be multiple discrete elements, which are circumferentially spaced.

A cooling air pathway can be formed through the second seal structure 104 by providing an outlet 140 in the second circumferential ring 124 and a passage 138 fluidly coupling the aperture 130 to the outlet 140. Thus, cooling air can flow from the aperture 130, through the passage 138, and out the outlet 140. The passage 138 and corresponding outlet 140 can be discrete elements, with, say, one each for each of the apertures 130, it contemplated that at least one of the passage 138 and the outlet 140 can be a circumferentially continuous or segmented, such that multiple apertures 130 are fluidly coupled to a single passage 138 or outlet 140.

The floating seal 108 can include various components adapted primarily for movement along the strut 94 in the radial direction. It will be appreciated, however, that the floating seal 108 can also allow for movement in the circumferential direction or the axial direction.

The dynamic mount 105 can dynamically couple the second seal structure 104 to the vane 86. The dynamic mount 105 can include the lower band 112 further including an annular seal 114, the upper band 65, and the strut 94 which can be further divided into a first strut segment 96, and a second strut segment 98. The first and second strut segments 96, 98 can be conceptual or physical divisions of the strut and are represented by a segment division line 110 which can be flush with a bottom surface of the lower band 112. The segment division line 110 can be defined as the location where the first strut segment 96, and the second strut segment 98 meet. The segment division line 110 can be a physical coupling such as, but not limited to, a weld or an adhesive strip. The first strut segment 96 can extend radially outward form the segment division line 110 and to the upper band 65. The second strut segment 98 can extend radially inward from the segment division line 110, through the plurality of apertures 130 provided in the second circumferential ring 124 and terminate at the radial inner end 97. The rib 132 can come into contact with at least a portion of the second strut segment 98, effectively coupling at least second seal structure 104, or the first seal structure 102 to the dynamic mount 105.

The dynamic mount 105, and more specifically the second strut segment 98 can coupled to a radial outer end 95 located radially outward from the lower band 112. The radial outer end 95 of the strut 94 can be coupled to at least a portion of the engine core casing 46, or the shroud surrounding the rotor 51 such that the strut 94 couples the second seal structure 104 to the upper band 65, or a portion of the engine core casing 46, or the shroud.

The annular seal 114 can form a fluid-tight seal between the lower band 112 and the first strut segment 96 of the strut. The annular seal 114 can be made of a soft material such as rubber, or any other suitable material. For example, the annular seal 114 can be an O-ring. The annular seal 114 can limit, or block fluid from flowing between the strut 94 and the lower band 112.

With the dynamic mount 105, the second seal structure 104 can move, such as by reciprocation, as need be relative to the strut 94. In this way, the second seal structure 104 can float radially by reciprocating relative to the strut 94. Since the seal elements 118, 119 are biased by the biasing elements 120, 121, the seal is maintained between the seal elements 118, 119 and the lower band 112.

As used herein, other non-limiting examples of the seal assembly 100 are presented. Like parts can be identified with like numerals. Variations of existing parts (e.g., an exemplary second seal structure 104) will increase by 100 with each figure.

Figure 4:
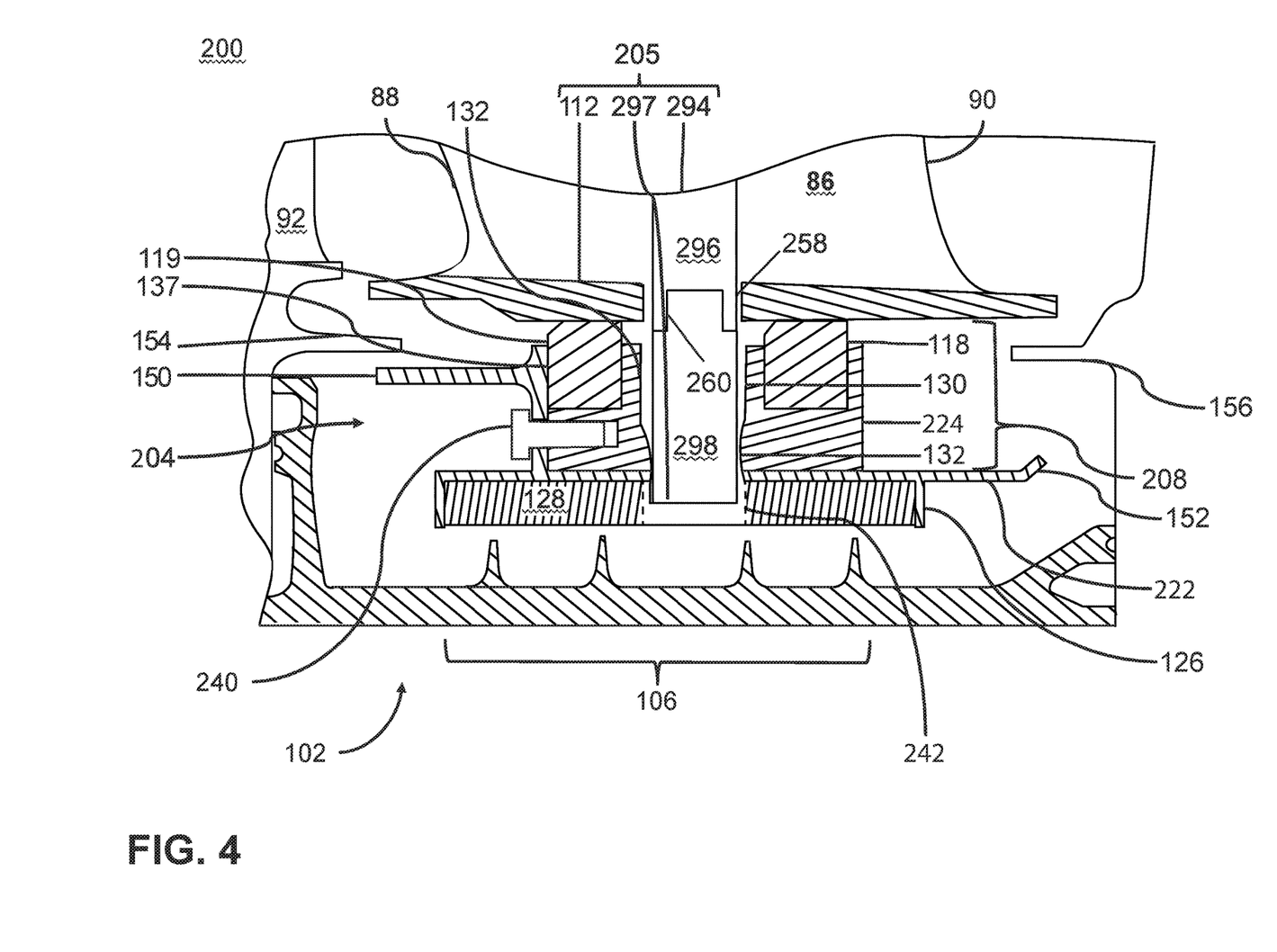
FIG. 4 is a schematic cross-section diagram of a variation to the exemplary seal assembly of FIG. 2.

FIG. 4 is an exemplary seal assembly 200 in accordance with that of FIG. 2 that can include the first seal structure 102, and a second seal structure 204 operatively coupled to a dynamic mount 205.

The second seal structure 204 can include a first circumferential ring 222, and a floating seal 208 including, at least, a second circumferential ring 224. The first and second circumferential rings 222, 224 can have the same function, and similar components of the first and second circumferential rings 122, 124 described herein.

The dynamic mount 205 can dynamically couple the second seal structure 204 to the vane 86. The lower band 112 can forgo the use of the annular seal 114 and instead leaves a gap region between the lower band 112 and the strut 94. In this instance, cooling air can flow between a portion of the strut 94 and the lower band 112.

The dynamic mount 205 may also include a strut 294 which can include a first strut segment 296 and the second strut segment 298 which can be connected to each other through threaded regions 258, 260. A portion of the second strut segment 298 can extend into a portion of the first strut segment 296, or vice-versa, with both including opposing threads.

The second strut segment 298 can extend through the aperture 130 of the second seal structure 204 and come into contact with the ribs 132 of the second circumferential ring 224, and at least a portion of the first circumferential ring 222. The first circumferential ring 222 can form a lower portion of the rib 132 such that both the first, and the second circumferential rings 222, 224 couple the second seal structure 204 to the vane 86.

The first circumferential ring 222 can include the first angel wing 150 located at an upstream portion of the first circumferential ring 222. The first angel wing 150 can be formed as an arm extending perpendicularly from a portion of the first circumferential ring 222. Alternatively, the first angel wing 150 can be a separate piece attached via suitable coupling methods such as, but not limited to, welding, fastening, adhesion, or the like.

The wear element 128 can fit within the seat 126 of the first circumferential ring 222, however, it can further include a through-hole 242. The through-hole 242 can be formed to circumscribe the radial inner end 297 of the strut 294. The radial inner end 297 can extend into a portion of the through-hole 242. The interior walls of the through-hole 242 can be threaded, and at least a portion of the exterior wall of the second strut segment 298 can be oppositely threaded. The threaded portions of the through-hole 242, and the second strut segment 298 can be adapted as such to allow for the second strut segment to be threaded into the through-hole 242. This can further couple the dynamic mount 105 to the second seal structure 204, beyond the use of the ribs 132. The through-hole 242 can additionally be used in place of, or in conjunction with the passage 138 as described prior.

An outlet 240 can be formed through at least a portion of the first circumferential ring 222, and the second circumferential ring 224 to provide a cooling air pathway. Cooling air can flow from a portion of the strut 294 (e.g., a hole formed on the exterior surface of a portion of the strut 294), through a portion of second circumferential ring 224, through the first circumferential ring 222, and out the outlet 240.

The second circumferential ring 224 can include the seal elements 118, 119, and forgo the use of the biasing elements 120, 121 described herein. The seal elements 118, 119 in this case can be formed of an elastic material such that they can be compressed in the radial direction and be biased to return to uncompressed state. As such, the seal elements 118, 119 can take on the role of the biasing elements 120, 121.

Figure 5:
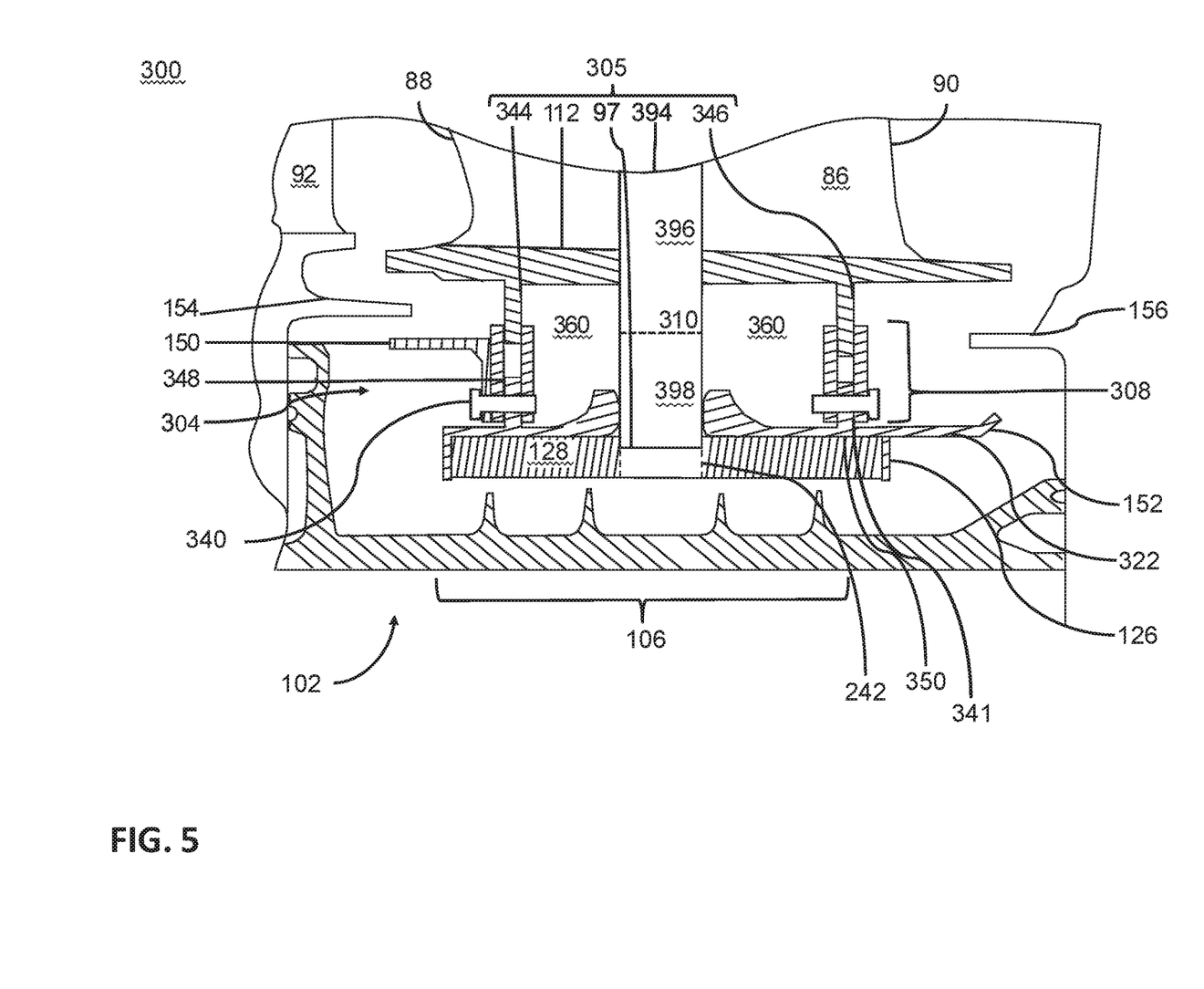
FIG. 5 is a schematic cross-section diagram of a variation to the exemplary seal assembly of FIG. 2.

FIG. 5 is an exemplary seal assembly 300 in accordance with that of FIG. 2 that can include the first seal structure 102, a second seal structure 304, and a dynamic mount 305.

The dynamic mount 305 can dynamically couple the second seal structure 304 to the vane 86. The lower band 112 of the dynamic mount 305 can abut against a strut 394 in a fluid tight manner such as to not allow cooling air to flow between a portion of the strut 394 and the lower band 112.

A first strut segment 396 can extend radially inward form the lower band 112 such that a segment division line 310 defined as the separation point of the first strut segment 396 and a second strut segment 398, is also radially inward from the lower band 112. Alternatively, the segment division line 310 can be radially outward the lower band 112.

The dynamic mount 305 can include the lower band 112 further including first protrusions 344, 346. The first protrusions 344, 346 can be defined as a portion of the lower band 112 extending radially inward the lower band 112. The first protrusions 344, 346 can be coupled to the one end of a fishmouth seal 308. The other end of the fishmouth seal 308 can be coupled to second protrusions 348, 349 of the second seal structure 304. The fishmouth seal 308 can operatively couple the dynamic mount 305 to the second seal structure 304. The fishmouth seal 308 can be used in conjunction with, or in replacement of the floating seal 108 described herein.

The first and second protrusions 344, 346, 348, 349 can both extend into the fishmouth seal 308. During operation of the turbine engine 10, the dynamic mount 305, or seal assembly 300 can move radially such that portions of the protrusions 344, 346, 348, 349 can become covered, or uncovered by the fishmouth seal 308. As used herein, the term "covered" can be any portion of the protrusions 344, 346, 348, 349 that are surrounded by the fishmouth seal 308, while the term "uncovered" can be any portion of the protrusions 344-349 that are not in direct contact with the fishmouth seal 308.

The second seal structure 304 can include a combined circumferential ring 322 that can be defined to be the combination of aspects of the first and second circumferential rings described herein. The dynamic mount 305, and more specifically the second strut segment 398 can come into contact with the second seal structure 304 at the ribs 132. The ribs 132 of the combined circumferential ring 322 can be used in placed of the aperture 130 described herein.

The rib 132 can extend over at least a portion of the second strut segment 398 and leave a purge cavity 362 between the lower band 112 and the combined circumferential ring 322. The purge cavity 362 can include an upstream outlet 340 similar to the outlet 240 described in FIG. 4. Portions of the first and second strut segments 396, 398 can include outlet holes on that lead directly into the purge cavity 362 such that cooling fluid can pass from strut 394, into the purge cavity 362 and out through the upstream outlet 340. There can also be a downstream outlet 341 that can be located a downstream edge of the seal assembly 300. The downstream outlet 341 can be used in the same manner as the upstream outlet 340 such that cooling fluid can pass from the strut 394, through the purge cavity 362, and out the downstream outlet 341 to a downstream portion of the seal assembly 300.

Benefits of the present disclosure include a broader selection of material for construction of the vane when compared to conventional vanes. For example, during operation of the turbine engine including conventional vanes, a plethora of forces (e.g., tensile, compressive, torsional, etc.), or loads can be applied to at least a portion of the vanes or to accompanying seals coupled to vanes. These forces can, require that specific materials be used to ensure the structural integrity of the vanes as the forces are transferred directly to the vanes themselves. However, the vanes as described herein can include, at least, the second seal structure, and more specifically of the floating seal, in combination with the strut, can reduce the stresses placed on the vane itself by transferring the majority of the stresses onto the lower band, or the upper band. It is contemplated that these components can provide for dynamic movement of the dynamic seal (e.g., the dynamic seal can move radially, circumferentially, or axially). This, in turn, can allow for the forces to be transferred to portions of the dynamic mount such as the upper band, or the lower band instead of the vane. This redirection of forces away from the vane, can allow of an alternative material to be used in the construction of the vane. The alternative material can be defined by any non-metal material. When compared to a conventional vane material (e.g., single crystal nickel-based alloys, or Inconel 718), the alternative material that can be more stable at higher temperatures, however, can have lower overall mechanical properties that would inhibit it from properly carrying the seal assembly without use of dynamic mount, or floating seal.

The alternative material can be a Ceramic Matrix Composite (CMC). CMC materials can be a combination of both ceramic materials, and composite materials with additional reinforcing materials (e.g., Carbon, Silicon Carbide, Alumina, Mullite or Alumina Silica). When compared to conventional materials, CMC materials can have a higher thermal shock resistance, higher thermal stability, high corrosion resistance, high toughness, or lower density. However, as mentioned CMC materials can have lower overall mechanical properties that would not allow them to carry conventional seal assemblies. It will be appreciated that the alternative material should not be limited to CMC materials but should include any suitable non-metal material. The implementation of the seal assembly the dynamic mount can allow for a wider variety of materials to be used in construction of the vane 86 as it reduces the forces, or loads exerted on the vane 86.

To the extent not already described, the different features and structures of the various aspects can be used in combination, or in substitution with each other as desired. That one feature is not illustrated in all of the examples is not meant to be construed that it cannot be so illustrated, but is done for brevity of description. Thus, the various features of the different aspects can be mixed and matched as desired to form new aspects, whether or not the new aspects are expressly described. All combinations or permutations of features described herein are covered by this disclosure.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

Various characteristics, aspects, and advantages of the present disclosure can also be embodied in any permutation of aspects of the disclosure including, but not limited to, the following technical solutions as defined in the enumerated aspects:

1. A turbine engine comprising an engine core comprising at least a compressor section, combustor section, and turbine section in axial flow arrangement and defining a rotor and a stator having a casing circumferentially surrounding at least a portion of the rotor, a first seal structure comprising a finger seal projecting from the rotor and circumferentially extending about the rotor, a plurality of circumferentially arranged vanes forming an upper band mounted to the casing and a lower band located radially above the finger seal, a plurality of struts having a radial outer end secured to the casing and a radial inner end extending radially inwardly beyond the lower band, and at least some of the struts extending through the vanes, and a second seal structure extending circumferentially about the first seal structure and comprising a floating seal movably mounted to at least some of the struts and forming a seal with the lower band, and a wear element circumferentially surrounding and confronting the finger seal.

2. The turbine engine of any preceding clause wherein the floating seal comprises a ring and at least one dynamic seal extending between the ring and the lower band.

3. The turbine engine of any preceding clause wherein the ring comprises multiple, circumferentially arranged segments.

4. The turbine engine of any preceding clause wherein the ring comprises a seal guide and the dynamic seal comprises a biasing element and a seal element coupled to the seal guide, with the biasing element biasing the seal element against the lower band.

5. The turbine engine of any preceding clause wherein the biasing element comprises a spring.

6. The turbine engine of any preceding clause wherein the seal guide comprises a seal guide channel and the spring resides in the seal guide channel.

7. The turbine engine of any preceding clause wherein at least a portion of the biasing element resides in the seal guide channel.

8. The turbine engine of any preceding clause wherein the ring further comprises an aperture operably coupled to the struts.

9. The turbine engine of any preceding clause wherein the aperture controls a relative radial movement of the ring.

10. The turbine engine of any preceding clause comprising a plurality of apertures and at least some of the struts are received in the apertures.

11. The turbine engine of any preceding clause wherein the apertures are at least partially defined by corresponding ribs.

12. The turbine engine of any preceding clause wherein the strut comprises multiple segments.

13. The turbine engine of any preceding clause wherein a first of the segments is mounted to a shroud and a second of the segments passes through the aperture and secures to the first segment.

14. The turbine engine of any preceding clause wherein at least the lower band of the vane is non-metal.

15. The turbine engine of any preceding clause wherein the non-metal is made of ceramic matrix composite.

16. The turbine engine of any preceding clause wherein the wear element comprises a honeycomb structure.

17. A turbine engine comprising an engine core comprising a rotor and a stator having a casing circumferentially surrounding at least a portion of the rotor, a plurality of circumferentially arranged vanes forming an upper band mounted to the casing and a lower band extending circumferentially about and spaced from the rotor, and a floating seal carried by at least one of the stator or vanes and radially movable relative to the lower band and sealing the lower band relative to the rotor.

18. The turbine engine of any preceding clause wherein the floating seal comprises a ring circumferentially surrounding the rotor and a dynamic seal between the ring and the lower band.

19. The turbine engine of any preceding clause wherein ring is axially or circumferentially constrained relative to the lower band.

20. The turbine engine of any preceding clause further comprises at least one strut operably coupling the ring to the lower band to axially constrain the lower band.

21. The turbine engine of any preceding clause wherein the at least one strut extends at least from the lower band to the ring.

22. The turbine engine of any preceding clause wherein the at least one strut extends from the casing.

23. The turbine engine of any preceding clause wherein the at least one strut extends through the vane.

24. The turbine engine of any preceding clause wherein the floating seal further comprises a dynamic seal moveable at least in the radial direction.

25. The turbine engine of any preceding clause wherein the dynamic seal comprises a biasing element and a seal element, with the biasing element biasing the seal element against the lower band.

What is claimed is:

1. A turbine engine comprising:
an engine core comprising at least a compressor section, a combustor section, and a turbine section in axial flow arrangement and defining a rotor and a stator having a casing circumferentially surrounding at least a portion of the rotor;
a first seal structure comprising a finger seal projecting from the rotor and circumferentially extending about the rotor;
a plurality of circumferentially arranged vanes forming an upper band mounted to the casing and a lower band located radially above the finger seal;
a plurality of struts, with each strut of the plurality of struts having a radial outer end defining a radial termination of each strut, the radial outer end being directly coupled to the casing and a radial inner end extending radially inwardly beyond the lower band, and at least some of the struts extending through the plurality of circumferentially arranged vanes; and
a second seal structure extending circumferentially about the first seal structure and comprising a floating seal movably mounted to and confronting the radial inner end of at least some of the struts of the plurality of struts and forming a seal with the lower band, and a wear element circumferentially surrounding and confronting the finger seal.

2. The turbine engine of claim 1 wherein the floating seal comprises a ring and at least one dynamic seal extending between the ring and the lower band.

3. The turbine engine of claim 2 wherein the ring comprises multiple, circumferentially arranged segments.

4. The turbine engine of claim 2 wherein the ring comprises a seal guide and the dynamic seal comprises a biasing element and a seal element coupled to the seal guide, with the biasing element biasing the seal element against the lower band.

5. The turbine engine of claim 4 wherein the biasing element comprises a spring and the seal guide comprises a seal guide channel wherein the spring resides in the seal guide channel.

6. The turbine engine of claim 5 wherein at least a portion of the biasing element resides in the seal guide channel.

7. The turbine engine of claim 2 wherein the ring further comprises an aperture operably coupled to the struts.

8. The turbine engine of claim 7 comprising a plurality of apertures and at least some of the struts are received in a respective aperture of the plurality of apertures.

9. The turbine engine of claim 8 wherein the apertures are at least partially defined by corresponding ribs.

10. The turbine engine of claim 8 wherein at least one strut of the plurality of struts comprises multiple segments.

11. The turbine engine of claim 10 wherein a first of the segments is mounted to a shroud and a second of the segments passes through the aperture and secures to the first of the segments.

12. A turbine engine comprising:
an engine core comprising a rotor and a stator having a casing circumferentially surrounding at least a portion of the rotor;
a plurality of circumferentially arranged vanes forming an upper band mounted to the casing and a lower band extending circumferentially about and spaced from the rotor;
at least one strut terminating in a radial outer end directly coupled to the casing and a radial inner end extending radially inwardly with respect to the lower band; and
a floating seal confronting the radial inner end of the at least one strut and being radially movable relative to the radial inner end and sealing the lower band relative to the rotor.

13. The turbine engine of claim 12 wherein the floating seal comprises a ring circumferentially surrounding the rotor and a dynamic seal between the ring and the lower band.

14. The turbine engine of claim 13 wherein the ring is axially or circumferentially constrained relative to the lower band.

15. The turbine engine of claim 14 further comprises at least one strut operably coupling the ring to the lower band to axially constrain the lower band.

16. The turbine engine of claim 15 wherein the at least one strut extends at least from the lower band to the ring.

17. The turbine engine of claim 16 wherein the at least one strut extends from the casing.

18. The turbine engine of claim 17 wherein the at least one strut extends through a respective vane of the plurality of circumferentially arranged vanes.

19. The turbine engine of claim 12 wherein the floating seal further comprises a dynamic seal moveable at least in the radial direction.

20. The turbine engine of claim 19 wherein the dynamic seal comprises a biasing element and a seal element, with the biasing element biasing the seal element against the lower band.

* * * * *